United States Patent [19]

Koga et al.

[11] Patent Number: 4,979,813

[45] Date of Patent: Dec. 25, 1990

[54] OPAQUE PROJECTOR

[75] Inventors: Ritsuo Koga; Kuroudo Hara, both of Tokyo, Japan

[73] Assignee: Plus Corporation, Tokyo, Japan

[21] Appl. No.: 438,069

[22] Filed: Nov. 20, 1989

[30] Foreign Application Priority Data

Nov. 25, 1988 [JP] Japan .................. 63-153441[U]

[51] Int. Cl.$^5$ ............................................. G03B 21/08
[52] U.S. Cl. ........................................ 353/67; 353/66; 353/DIG. 4; 353/75
[58] Field of Search ............... 353/67, 66, 65, DIG. 4, 353/94, 63, 64, 75, 57, 58, 98

[56] References Cited

U.S. PATENT DOCUMENTS

| | | | |
|---|---|---|---|
| 1,373,491 | 4/1921 | Detwiler et al. | 353/63 |
| 3,619,048 | 11/1971 | Engert et al. | 353/66 |
| 3,915,567 | 10/1975 | Altman | 353/66 |
| 3,947,103 | 3/1976 | Altman | 353/66 |
| 4,682,868 | 7/1987 | Constantin et al. | 353/66 |
| 4,690,527 | 9/1987 | Ohtorii | 353/63 |

FOREIGN PATENT DOCUMENTS 0000622 4/1980 Fed. Rep. of Germany ........ 353/67

*Primary Examiner*—William A. Cuchlinski, Jr.
*Assistant Examiner*—William C. Dowling
*Attorney, Agent, or Firm*—Fleit, Jacobson, Cohn, Price, Holman & Stern

[57] ABSTRACT

An opaque projector includes a light source, a stage through which the light radiating from the light source passes and on which an object is placed, a projection mirror for reflecting light reflected by the object, and a projector lens for gathering the light reflected by the projection mirror to form an image of the object on an image projecting surface located outside of the projector. A reflection mirror for reflecting the light from the light source to illuminate the object is provided on each of the two sides of the projection mirror. The light source is disposed in front of the projeciton mirror and on the inner sides of the reflection mirrors. The reflection mirrors and light source are disposed at positions relative to each other and to the projection mirror which ensures that the light reflected by the reflection mirrors, and regularly reflected by the object and the stage, is not incident on the projection lens and that the real and virtual images of the light source exist outside of the field angle of the projection lens.

18 Claims, 4 Drawing Sheets

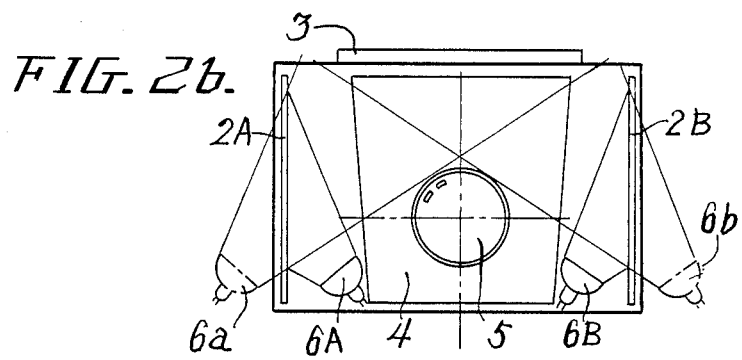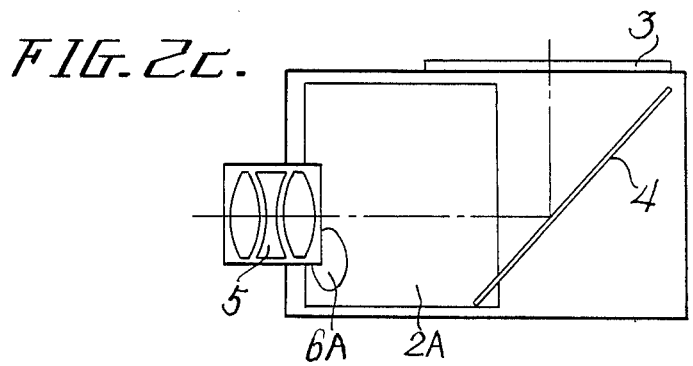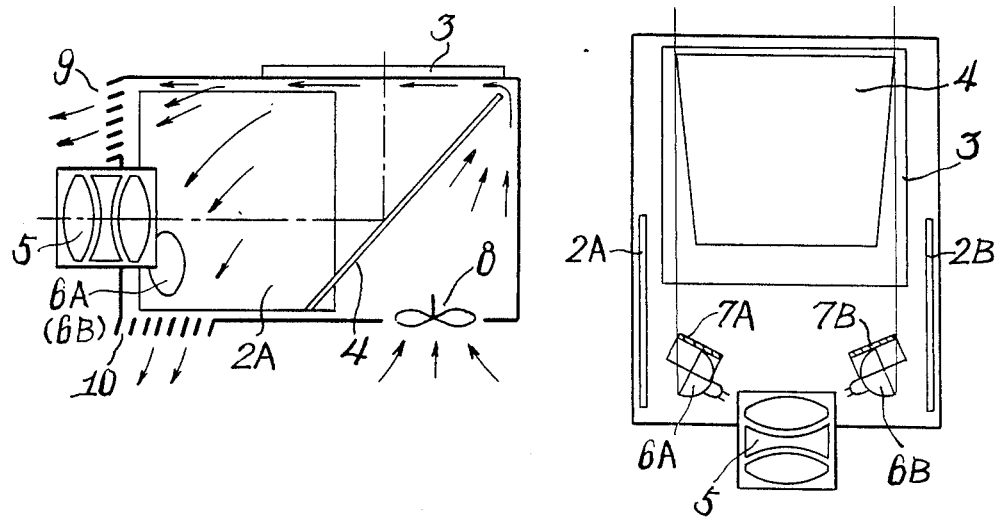

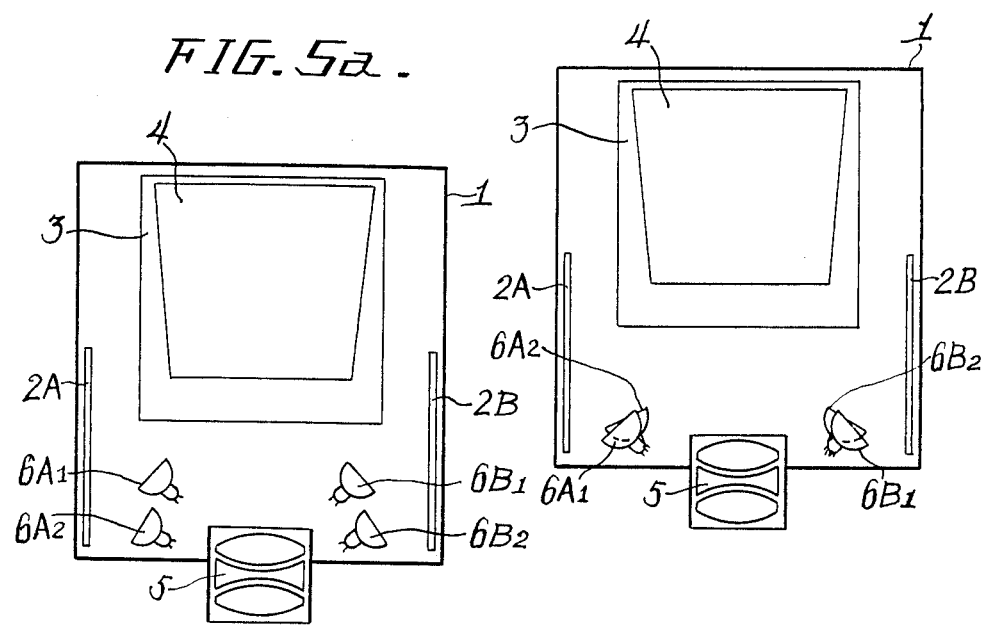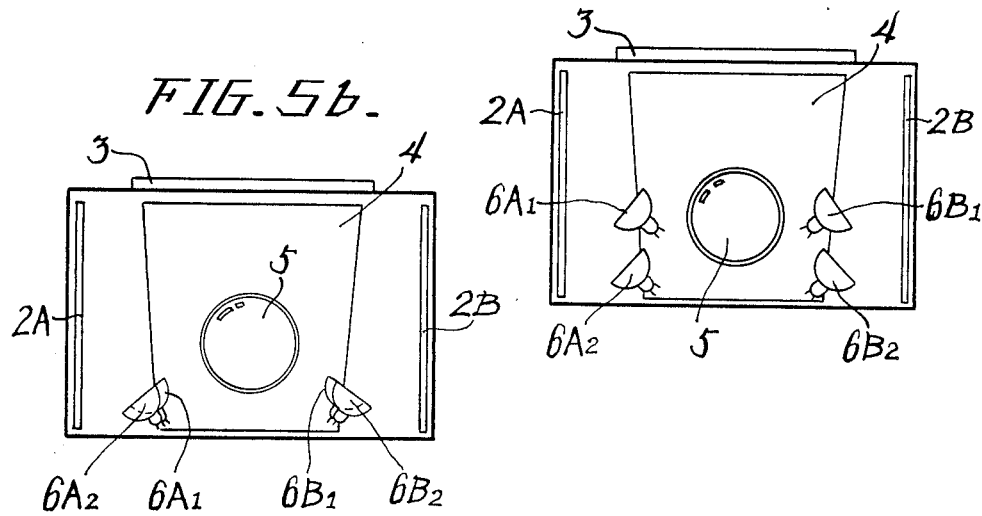

OPAQUE PROJECTOR

BACKGROUND OF THE INVENTION

1. Field of the Invention

The present invention relates to an opaque projector, and more particularly, to an opaque real image projector for forming a real image of an object, such as a document, using the rays of light coming from a light source through a reflecting mirror, irregularly reflected by the object and arriving at an image projecting surface through a projection mirror and a projection lens.

2. Description of the Related Art

FIG. 7 shows a conventional, commonly used opaque projector of the type in which an object placed on a stage 11 made of glass or the like is directly illuminated by light sources 12. This projector also includes a projection mirror 13 for reflecting the light emanating from the object, a projection lens 14 and a casing 15.

In the opaque projector of the above-described type, the light sources 12 must be disposed at a position which ensures that the rays of light coming from the light source 12 and regularly reflected by the object and the stage 11 according to the law of reflection are not incident on the projection lens 14 through the projection mirror 13, so as to prevent deterioration in the resolution of the image caused by the regularly reflected light. Secondly, the light sources 12 have to be located outside of the angle of visibility, or field angle, of the projection lens 14. Thirdly, the light sources 12 must be located far from the stage 11 so that the stage 11 can be illuminated uniformly. However, it is practically impossible to provide a sufficiently long optical path from the viewpoint of the size of a projector, so a plurality of light sources 12 having a low luminous flux are employed to illuminate the stage 11 sideways.

To achieve more uniform illumination, the light sources 12 may be disposed farther away from the stage 11. However, this makes the resultant projector wider and taller. Also, a projector with a large number of light sources may be heavy, expensive, complicated in its structure, and is therefore inconvenient to be carried from one place to another for installation. Reversely, if the light sources 12 are located closer to the stage 11, the object will be illuminated non-uniformly.

In view of these problems, Japanese Utility Model Laid-Open No.sho 61-11148 proposes an opaque projector which is reduced in size and which is improved to eliminate the problem involving the non-uniform illumination. FIG. 8 shows this projector. In this projector, the light sources 12 are disposed at the front of the projector at a position which faces the projection mirror 13, so that the object can be illuminated by the rays of light emitting from the light sources 12 and relfected by the projection mirror 13.

Japanese Utility Model Laid-Open No.sho 61-16544 describes an opaque projector which is intended to achieve uniform illumination of an object while improving illumination efficiency. FIG. 9 shows this projector. This projector has a plurality of illumination mirrors 16 around the projection mirror 13. The illumination mirrors 16 are provided in such a manner that they expand in the upward and forward directions. The light radiating from the light sources 12 are reflected toward the stage 11 by the illumination mirrors 16 and the projection mirror 13.

However, in the opaque projector shown in FIG. 8, since the light sources 12 are disposed in opposed relation to the projection mirror 13, the rays of light radiate from the light sources 12, are reflected by the projection mirror 13, and irradiate the stage 11 and the object from the direction substantially perpendicular to them. In that case, the irradiation is reflected back by the object or the like regularly (specularly) in the direction substantially perpendicular to it owing to the law of reflection, and is incident on the projection lens 14 through the projection mirror 13, causing the resolution of the image formed to be greatly degraded, i.e., causing so-called halation.

In the case of the opaque projector shown in FIG. 9, since the rays of light radiating from the light sources 12 are all directed toward the stage 11 by the projection mirror 13 and the plurality of illumination mirrors 16 provided separately from the projection mirror 13 so as to increase the illumination efficiency, the overall illumination mirrors 16 have to have a multi-plane form so as to prevent the light regularly reflected by the object by the law of reflection from being incident on the projection mirror 13. This makes the structure of the projector complicated. Furthermore, in order to use the projection mirror 13 also as the illumination mirror, the light sources 12 have to be disposed at the two sides of the projection mirror 13 at a position which ensures that part of the illumination of the light sources 12 can be incident thereon. This, together with the complicated structure of the projector, contributes to an increased lateral dimention (the size in the lateral direction of the projection mirror 13) of the projector.

SUMMARY OF THE INVENTION

The present invention is directed to overcoming the aforementioned problems of the prior art, and has an object of providing an opaque projector which enables halation of an image projected to be eliminated by disposing light sources on the inner sides of the reflection mirrors located at the two sides of a stage and in front of a projection mirror, at a position which ensures that the rays of light regularly reflected by an object and the stage are not incident on a projection lens and that the real and virtual images of the light sources are located outside of the angle of visibility, or field angle, of the projection lens, which enables the optical path from the light sources to the stage to be made long to ensure uniform illumination, and which is small in size and light in weight and simple.

BRIEF DESCRIPTION OF THE DRAWINGS

FIGS. 2(a), 2(b) and 2(c) are respectively plan, front and side views of the projector of FIG. 1;

FIG. 3 is a plan view of another example of the projector of FIG. 1;

FIG. 4 is a side view of the projector, illustrating how it is cooled;

FIGS. 5(a) and 5(b) are respectively plan and front views of a projector, showing a second embodiment of the present invention;

FIGS. 6(a) and 6(b) are respectively plan and front views of a projector, showing a third embodiment of the present invention.

DETAILED DESCRIPTION OF THE PREFERRED EMBODIMENTS

Figure 1:
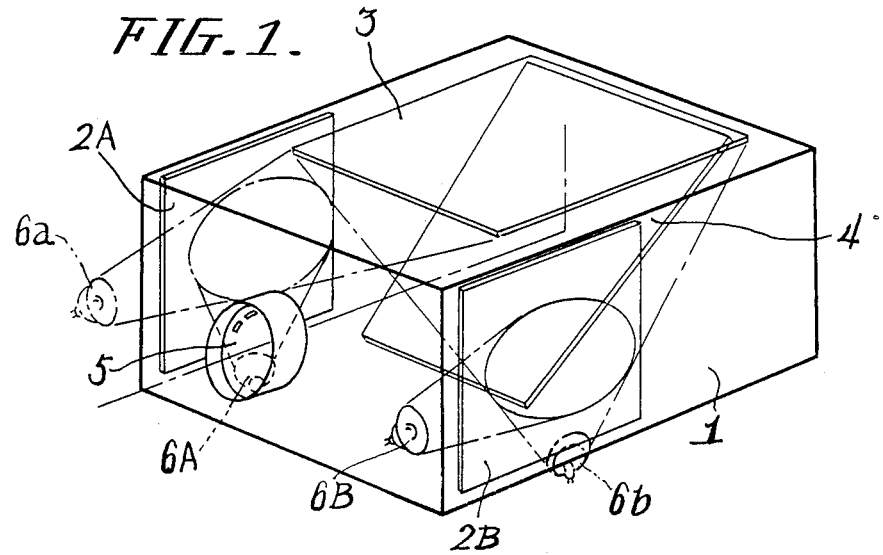
FIG. 1 is a perspective view of a projector, showing a first embodiment of the present invention.

A first embodiment of the present invention will be described below with reference to FIGS. 1 to 4. Referring first to FIGS. 1 and 2, an optical projector has a casing 1 of a rectangular parallelepiped. On the inner surface of the side plates of this casing 1 are attached reflection mirrors 2A and 2B. They are provided at the position which shifts toward the front of the casing 1 from the midpoint of the side plate in such a manner that they face each other. The reflection mirrors 2A and 2B may be almost as long as the side plates. A stage 3 through which the rays of light reflected by the reflection mirrors 2A and 2B pass is provided on the upper surface of the casing 1. The reflection mirrors 2A and 2B and the stage 3 are positioned perpendicular to each other. The stage 3 is formed of a glass having a suitable size which ensures that an object to be projected (not shown), such as a document or a thin three-dimentional object, can be placed thereon.

Inside the casing 1 is also provided a projection mirror 4 which receives the rays of light reflected by the object placed on the stage 3. As can be seen in FIGS. 1 and 2(c), the projection mirror 4 is inclined by about 45 degrees with respect to the horizontal plane. The projection mirror 4 has substantially a trapezoidal form. It is positioned such that the long base thereof is located adjacent to one side of the stage 3. A projection lens 5 for gathering the light reflected by the projection mirror 4 is provided at the front of the casing 1.

Inside the casing 1 are also provided light sources 6A and 6B which may be made a halogen lamp. They are located in front of the projection mirror 4 and on the inner reflecting side of the reflection mirrors 2A and 2B. They are disposed such that the centers of the optical axes thereof are respectively directed toward the inner sides of the reflection mirrors 2A and 2B. More specifically, they are disposed at a position which is toward the front of the casing from the center of the reflection mirrors 2A and 2B and at which they illuminate the reflection mirrors 2A and 2B from below, as shown in FIGS. 1, 2(a) and 2(b), so that the rays of light reflected by the reflection mirrors 2A and 2B can irradiate the entirety of the stage 3.

Figure 2A:
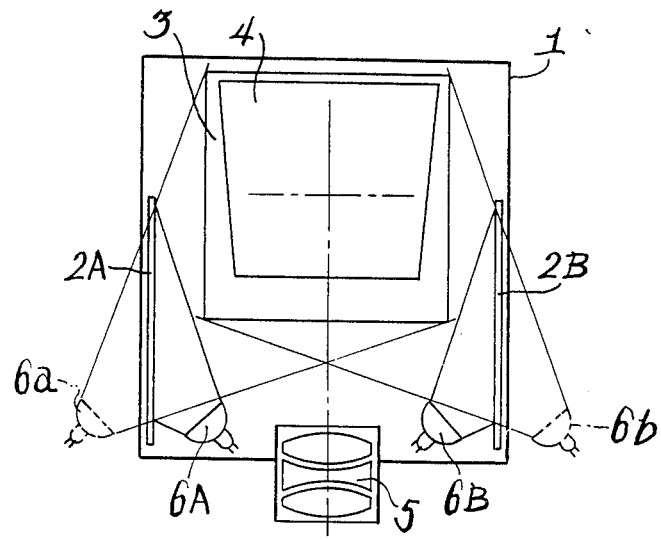
Figure 7:
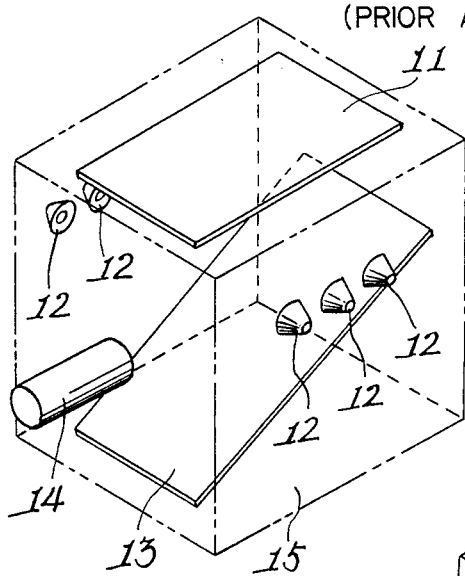
FIGS. 7 to 9 respectively show a conventional projector.
Figure 8:
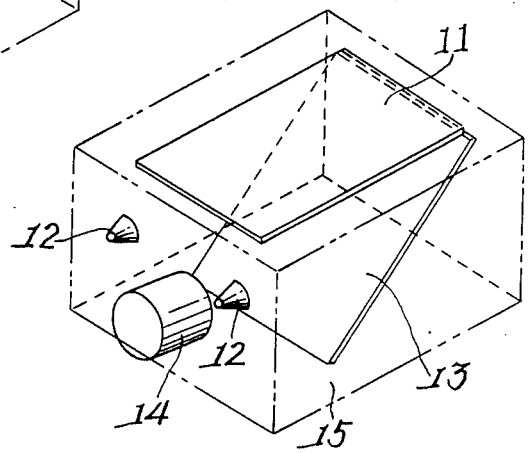
Figure 9:
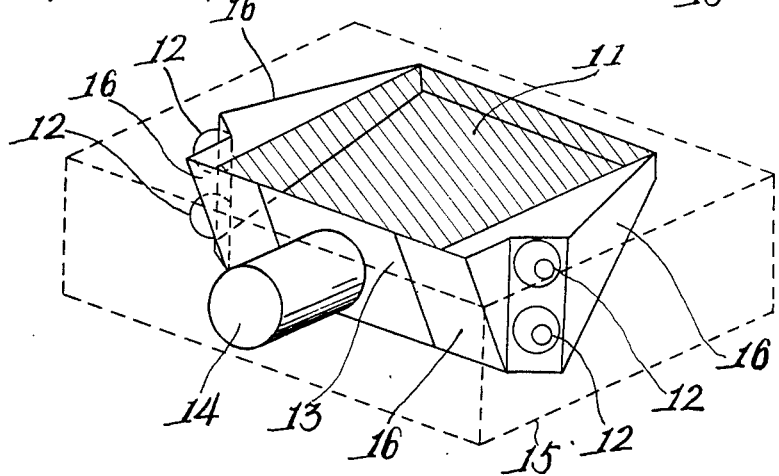

More specifically, the light sources 6A and 6B are disposed at a position which ensures that the rays of light coming from the light sources and the reflection mirrors 2A and 2B, and regularly reflected by the object and the stage 3, are not incident on the projection lens 5 either directly or through the projection mirror 4 and further, are disposed at a position where (the real images of) the light sources 6A and 6B and virtual images 6a and 6b of the light sources 6A and 6B exist outside the angle of visibility i.e. field angle, of the projection lens 5, as shown in FIGS. 1, 2(a) and 2(b). In other words, the light sources 6A and 6B are disposed at a position which ensures that the only rays of light which are made incident on the projection lens 5 are those coming from such light sources through the reflection mirrors 2A and 2B, irregularly reflected by the object and the stage 3, and in turn reflected by the projection mirror 4.

So long as the above-described conditions are fulfilled, the light sources 6A and 6B may be disposed at any position other than that shown in FIGS. 1 and 2, i.e., on the inner side of the width of the projection mirror 4 and in front of it, as shown in FIG. 3. In that case, the rays of light emitting from the light sources 6A and 6B may be reflected by the projection mirror 4 in the direction in which they irradiate the stage 3 and the object from the direction perpendicular to them, this irradiation being reflected regularly by the stage 3 and the object in the direction substantially perpendicular to them and incident on the projection lens 5 through the projection mirror 4. In order to prevent this, in this example shown in FIG. 3, the sides of the light sources 6A and 6B which face the projection mirror 4 are respectively covered by light blocking members 7A and 7B. In this way, it is possible to locate the projection mirror 4 on the inner side of critical lines L1 and L2 of the rays of light directly emitting from the light sources. The critical lines are determined by the positional relationship between the light sources 6A and 6B and the light blocking members 7A and 7B.

Next, the operation of the projector will be described. The rays of light emitting from the light sources 6A and 6B are respectively reflected by the reflection mirrors 2A and 2B provided at the two sides of the casing, as shown in FIGS. 1, 2(a) and 2(b), and irradiate the front surface of the stage 3 obliquely from below. At that time, the stage 3 is virtually illuminated by the virtual images 6a and 6b located on the outer sides of the reflection mirrors 2A and 2B therethrough. This ensures sufficiently long optical path between the stage 3 and the virtual images 6a and 6b, and, hence, the uniform illumination over the entire surface of the stage 3. This also makes the intensity of light reflected by the object placed on the stage 3 substantially uniform. The reflected light from the object is reflected by the projection mirror 4 and is gathered by the projection lens 5 to form an image on a projecting surface located outside of the projector at a distance determined by the focal point of the projection lens 5.

At that time, as stated above, neither the light reflected regularly by the object and the stage 3 nor the direct light emitting from the real and virtual images of the light sources 6A and 6B is incident on the projection lens 5 through the projection mirror 4 or directly due to the positional relationship between the light sources 6A and 6B, the reflection mirrors 2A and 2B and the projection mirror 4. It is therefore possible to completely prevent halation in which the resolution of the image formed is degraded, which would occur by the regularly reflected light and the direct light emitting from the light source.

As stated above, the light sources 6A and 6B are disposed in front of the projection mirror 4 and on the inner sides of the reflection mirrors 2A and 2B, and, if necessary, the light blocking members 7A and 7B are provided. In consequence, incidence of the regularly reflected light or the direct light on the projection lens 5 can be prevented while a long optical path is assured. As a result, the width of the projector (the size thereof in the direction perpendicular to the surface of the reflection mirrors 2A and 2B) can be reduced to that of the stage 3 theoretically. Furthermore, since the components of the projector can be accommodated within the space of the rectangular parallelepiped, the projector can be made simple and small.

In the projector of the above-described type, the light sources 2A and 2B are heated to a comparatively high temperature, thereby heating the interior of the casing 1. This may cause damage to the components of the projector and the object placed on the stage 3. Hence, the interior of the casing 1 may be forcibly cooled in the manner described below.

FIG. 4 is a view similar to FIG. 2(c), showing the opaque projector with this cooling system. The cooling system includes a cooling fan 8 provided below the projection mirror 4, a vent 9 provided above the projection lens 5, and a vent provided below the light sources 6A and 6B. In this projector, the air sucked into the interior of the casing 1 by the cooling fan 8 passes the rear of the projection mirror 4, reaches the upper portion of the casing 1 and then moves forward along the inner surface of the stage 3, as shown in FIG. 4. In consequence, the stage 3 is directly cooled effectively, and the damage due to heat to the object placed on the stage, such as a document, may be prevented.

While part of the air which has cooled the stage 3 is discharged from the vent 9, the remainder passes through the light sources 6A and 6B and is discharged from the lower vent 10. In consequence, the light sources 6A and 6B are cooled, and heating of the interior of the casing 1 can be thereby prevented.

The amount of heat radiating from the light sources 6A and 6B can be reduced to increase the cooling efficiency by providing suitable casings (not shown) which surround the light sources 6A and 6B in such a manner that they do not block the illumination light from the light sources 6A and 6B. In that case, the casing may also serve as the light blocking members 7A and 7B. Furthermore, if a hot ray penetrating mirror is used as the reflection mirrors 2A and 2B, an increase in the temperature of the stage 3 can be prevented more effectively.

Next, second and third embodiments of the present invention will be described in detail with reference to FIGS. 5 and 6, respectively. In these embodiments, a brighter and more uniform illumination is provided than that in the first embodiment by disposing a plurality of light sources on each side of the projection lens 5.

More specifically, in the second embodiment shown in FIGS. 5a and 5b, light sources 6A1, 6A2 and 6B1, 6B2 are disposed on each side of the projection lens 5 in such a manner that they are aligned with each other in the axial direction of the projection lens 5. The adjacent light sources 6A1 and 6A2 are disposed such that the central lines of the optical axes thereof are not parallel to each other so that the angles of incidence of the illuminations on the reflection mirror 2A can slightly differ and so that a uniform illumination of the stage 3 can be thereby provided in spite of the different positions of the light sources 6A1 and 6A2. The light sources 6B1 and 6B2 are provided in the same manner. In the the embodiment shown in FIGS. 6a and 6b, the light sources 6A1, 6A2 or 6B1, 6B2 are disposed on each side of the projection lens 5 in such a manner that they are aligned with each other in the direction perpendicular to the axial direction of the projection lens 5 (in the direction of the height of the projector). In this embodiment, the center lines of the optical axes of the light sources 6A1, 6A2 and 6B1, 6B2 are not parallel to each other so that the stage 3 can be more uniformly illuminated, as in the case of the above-described second embodiment.

In the second and third embodiments, the light sources 6A1, 6A2 and 6B1, 6B2 are disposed at a position which ensures that the rays of light emitted from these light sources and reflected by the reflection mirrors 2A and 2B irradiate the object through the stage 3, but the rays of light emitted from the light sources and reflected from the reflection mirrors which is regularly reflected by the object and the stage 3, are not incident on the projection lens 5 either indirectly or directly, and which also ensures that the real and virtual images of the light sources 6A1, 6A2, 6B1, 6B2 are outside the angle of visibility of the projection lens 5, as in the case of the first embodiment. Furthermore, the light blocking members 7A and 7B shown in FIG. 3 and a cooling method shown in FIG. 4 may be provided, if necessary.

The number of light sources is not limited to any of those adopted in the above-described embodiments but a larger number of light sources may be employed.

As will be understood from the foregoing description, in the opaque projector according to the present invention, the reflection mirrors are provided in front of and on the two sides of the projection mirror, and the light sources are disposed in front of the projection mirror and on the inner or reflecting sides of the reflection mirrors at a position which ensures that the rays of light coming from the light sources, reflected by the reflection mirrors and regularly reflected by the object and the stage are not incident on the projection lens, and that the real and virtual images of the light sources exit outside of the angle of visibility or field angle, of the projection lens, as stated above. In consequence, the opaque projector according to the present invention has the following advantages:

First, neither the regularly reflected light nor the direct light from the light sources are incident on the projection lens; the projection lens receives only the irregularly reflected light emanating from the object and the stage and reflected by the projection mirror. In consequence, no halation occurs in an image formed, and an image can be therefore formed at a high resolution.

Secondly, although the light sources are located on the inner reflecting sides of the reflection mirrors, the virtual images thereof exist on the outside of the projector, and the stage is virtually illuminated by these virtual images. In consequence, in spite of the fact that the real light sources are inside of the projector, the optical path can be made sufficiently long and the uniform illumination can be thus performed. In other words, since it is not required that the real light sources be provided far away from the stage in order to achieve uniform illumination, or that the number of light sources are increased, the projector can be made small, light in weight, inexpensive and simple. This allows the projector to be easily carried from one place to another for installation and use.

Thirdly, since the light sources are disposed on the inner reflecting sides of the reflection mirrors, the size of the projector can be reduced to the width of the stage, at a maximum.

Lastly, since the shape and structure of the reflection mirrors are simpler than those of the conventional multi-plane illumination mirrors, the internal structure of the entire projector can be made simple. Furthermore, the components of the projector can be accommodated within the narrow space of the rectangular parallelpiped, and the structure of the projector can be thereby made simple.

What is claimed is:

1. In an opaque projector including a light source, a stage through which the light radiating from said light source passes and on which an object is placed, a projection mirror for reflecting light reflected by said object, and a projector lens for gathering the light reflected by said projection mirror to form an image of said object on an image projecting surface located outside of said projector, the improvement comprising:

at least one reflection mirror on at least one side of the projection mirror for reflecting light from the light source to illuminate said object on said stage, and at least one light source disposed on the reflecting side of said projection mirror and on the reflecting side of said at least one reflection mirror, said at least one reflection mirror and at least one light source being positioned relative to each other and to the projection mirror so that the light from said at least one light source is projected onto said at least one reflection mirror and is not incident on said projection mirror or on the projection lens, the light reflected by said at least one reflection mirror, and regularly reflected by said object and said stage, is not incident on said projection mirror or on the projection lens, and the real and virtual images of said light source, reflected by said at least one reflection mirror, exist outside of the field angle of said projection lens.

2. An opaque projector as claimed in claim 1 wherein: said at least one reflection mirror comprises at least one reflection mirror on each side of said projection mirror, said reflection mirrors being parallel to each other; and said at least one light source comprises at least one light source for each reflection mirror.

3. An opaque projector as claimed in claim 1 and further comprising:

light blocking means disposed on the side of said at least one light source between said at least one light source and said projection mirror for blocking light from said least one light source from being incident on said projection mirror.

4. An opaque projector as claimed in claim 3 and further comprising:

cooling fan means for drawing air from outside the projector into the projector and producing flow of said air along the inner surface of said stage, and discharging means for exhausting said air from the vicinity of said at least one light source.

5. An opaque projector as claimed in claim 1, wherein said at least one reflection mirror is in a plane extending perpendicular to the plane of said stage.

6. An opaque projector as claimed in claim 2 wherein said reflection mirrors are in planes extending perpendicular to the plane of said stage.

7. An opaque projector as claimed in claim 6, and further comprising:

light blocking means disposed on the side of said at least one light source between said at least one light source and said projection mirror for blocking light from said at least one light source from being incident on said projection mirror.

8. An opaque projector as claimed in claim 7 and further comprising:

cooling fan means for drawing air from outside the projector into the projector and producing flow of said air along the inner surface of said stage, and discharging means for exhausting said air from the vicinity of said each light source.

9. An opaque projector as claimed in claim 4 wherein:

said light blocking means comprises planar members between said at least one light source and said projection mirror.

10. An opaque projector as claimed in claim 8 wherein:

said light blocking means comprises planar members between each light source and said projection mirror.

11. In an opaque projector including a light source, a stage through which the light radiating from said light source passes and on which an object is placed, a projection mirror for reflecting light reflected by said object, and a projector lens for gathering the light reflected by said projection mirror to form an image of said object on an image projecting surface located outside of said projector, the improvement comprising:

a reflection mirror on each side of said projection mirror for reflecting the light from said light source to illuminate said object through said stage, said reflection mirrors being parallel to each other and perpendicular to the plane of said stage and said light source being disposed in front of said projection mirror and on the inner reflecting sides of said reflection mirrors, and at a position which ensures that the light reflected by said reflection mirrors, and regularly reflected by said object and said stage, is not incident on said projection lens and that the real and virtual images of said light source exist outside of the field angle of said projection lens.

12. An opaque projector as claimed in claim 11 and further comprising:

light blocking means disposed on the side of said at least one light source between said at least one light source and said projection mirror for blocking light from said at least one light source from being incident on said projection mirror.

13. An opaque projector as claimed in claim 11 and further comprising:

cooling fan means for drawing air from outside the projector into the projector and producing flow of said air along the inner surface of said stage, and discharging means for exhausting said air from the vicinity of said at least one light source.

14. An opaque projector as claimed in claim 12 and further comprising:

cooling fan means for drawing air from outside the projector into the projector and producing flow of said air along the inner surface of said stage, and discharging means for exhausting said air from the vicinity of said at least one light source.

15. An opaque projector as claimed in claim 12 wherein:

said light source comprises a separate light means projecting onto each respective reflection mirror.

16. An opaque projector as claimed in claim 15 wherein:

said separate light means comprises a plurality of projection lights.

17. An opaque projector as claimed in claim 1 wherein:

said at least one light source comprises a plurality of light sources.

18. An opaque projector as claimed in claim 2 wherein:

a plurality of light sources are provided for each reflection mirror.

* * * * *